UNITED STATES PATENT OFFICE.

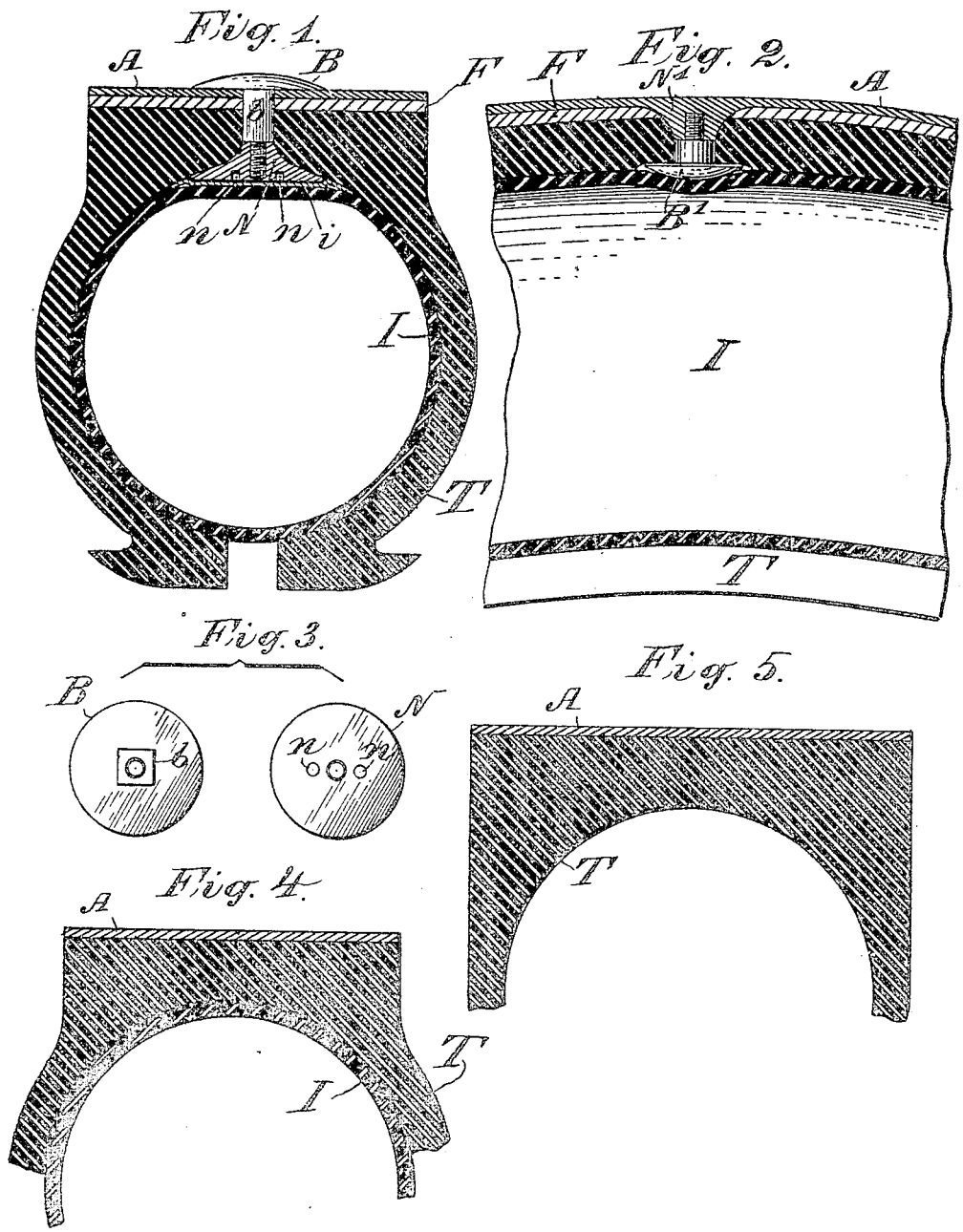

JEHU C. MOORE, OF NEW YORK, N. Y.

TIRE-ARMOR.

No. 800,864.  Specification of Letters Patent.  Patented Oct. 3, 1905.

Application filed October 28, 1904. Serial No. 230,364.

*To all whom it may concern:*

Be it known that I, JEHU C. MOORE, a citizen of the United States, residing in the borough of Brooklyn, in the county of Kings, in the city and State of New York, have invented certain new and useful Improvements in Tire-Armor, of which the following is a specification.

This invention relates to armor for rubber tires, and especially pneumatic tires for automobiles; and the object is to provide the tire with a light resilient protective armor of metal which will prevent punctures and undue wear of the tire and aid also in the traction effect of driving-wheels. The armor also lessens the skidding of the wheels.

In the accompanying drawings, which illustrate embodiments of the invention, Figure 1 is a cross-section of an automobile-tire provided with the armor in its preferred form. Fig. 2 is an axial section of a part of such a tire and the armor. This figure shows a fastening or securing means which differs slightly from that seen in Fig. 1. Fig. 3 represents views showing the securing bolt and nut seen in Fig. 1. Fig. 4 shows a form of the invention where the arm is applied directly to the flat tread or face of the tire, and Fig. 5 is a similar view showing the armor applied to a flat tread which is as broad as the diameter of the tire.

Referring especially to Figs 1, 2, and 3, T designates a rubber tire for an automobile, said tire having a flat tread or face. I is the inner tube of the tire. To the flat tread is applied a strip or band F, of felt or like soft fibrous material, and over this is applied the armor A. This armor is a thin resilient endless band of metal of such size or length that when the tire is distended the metal band will fit it tightly, so as not to be readily displaced. Preferably the armor-band will be of thin spring-steel with its ends scarfed and brazed together in the manner of a band-saw.

For the purpose of retaining the armor-band in place on the tire the securing means shown in Figs. 1 and 3 may be employed. This consists of a bolt B, having a head of any suitable form and a square shank $b$, and a nut N, having in it holes $n$ or some similar known means to enable it to be secured tightly onto the bolt from the inside of the tire. This nut is made somewhat conical, as shown, so that it may extend in far enough to properly engage the screw on the bolt.

Fig. 2 shows the nut N' formed on or secured to the inner face of the armor-band A and the bolt B' screwed into it through the tire from the inside. This construction does not present any projections or roughening on the outer face of the band A. Either or both of these fastenings may be used. For example, the fastenings seen in Fig. 1 may be used on the driving-wheels, and the fastenings seen in Fig. 2 on the driven wheels. Cement may be used to further secure the armor to the tire, and only a moderate number of such extraneous securing devices need be used on the tire.

The felt F is employed merely to obviate the convection of heat from the metallic armor to the rubber of the tire; but neither this non-conducting material nor the extraneous securing devices are deemed absolutely essential to the effective working of the invention. In Figs. 4 and 5 the armor-band A is represented as applied directly to the flat tread of the rubber tire, on which it may be shrunk tightly in the manner before stated—that is, by making the armor-band a little less in diameter than the tread of the distended tire. It may of course be cemented also.

In the tire as seen in Fig. 1 it is preferred to interpose a patch or piece of fabric $i$ between the nut N and the inner tube I to protect the tube against chafing on the nut. The armor-band lies flat on the face of the ungrooved rubber outer tire or shoe and extends widthwise the entire breadth of the face on the rubber. As the fastening devices are disposed along the middle of the width of the tread and go through the tire, it will be obvious that the band may be fitted on any tire having a uniformly flat tread and an inner tube.

Having thus described my invention, I claim—

1. A pneumatic tire, comprising an inner tube, a hollow outer tire having a flat, ungrooved tread, a protecting-armor consisting of a thin, flat, endless flexible band of resilient metal extending about said tread, and means for securing said band in place, said means consisting of screw-fastening devices which extend through the said outer tire to the hollow therein and are disposed along the middle of the width of the tire.

2. A pneumatic tire, comprising an inner tube, a hollow outer tire having a flat, ungrooved tread, a protecting-armor consisting of a thin, flat, endless flexible band of resilient metal extending about said tread, and means for securing said band in place, said means consisting of bolts which extend through the tire-band and the outer tire to the hollow in the latter, and conical nuts on said bolts within the hollow of the tire.

3. A pneumatic tire, comprising an inner tube, a hollow outer tire of rubber having a flat, ungrooved tread, a band of felt which embraces the tire and covers said tread, a thin, flexible, flat and endless band of resilient metal covering said felt, and screw-fastening means, which extend through said felt and through the said outer tire to the hollow therein, substantially as set forth.

4. A rubber tire, having a flat, ungrooved tread, a flat, endless, flexible band of thin, resilient metal extending about said tread, and means for securing said band in place, said means comprising a bolt with a square shank, which extends inwardly through the band and tread of the tire, and a conical nut on said bolt within the tire.

In witness whereof I have hereunto signed my name, this 25th day of October, 1904, in the presence of two subscribing witnesses.

JEHU C. MOORE.

Witnesses:
HENRY CONNETT,
WILLIAM J. FIRTH.